UNITED STATES PATENT OFFICE.

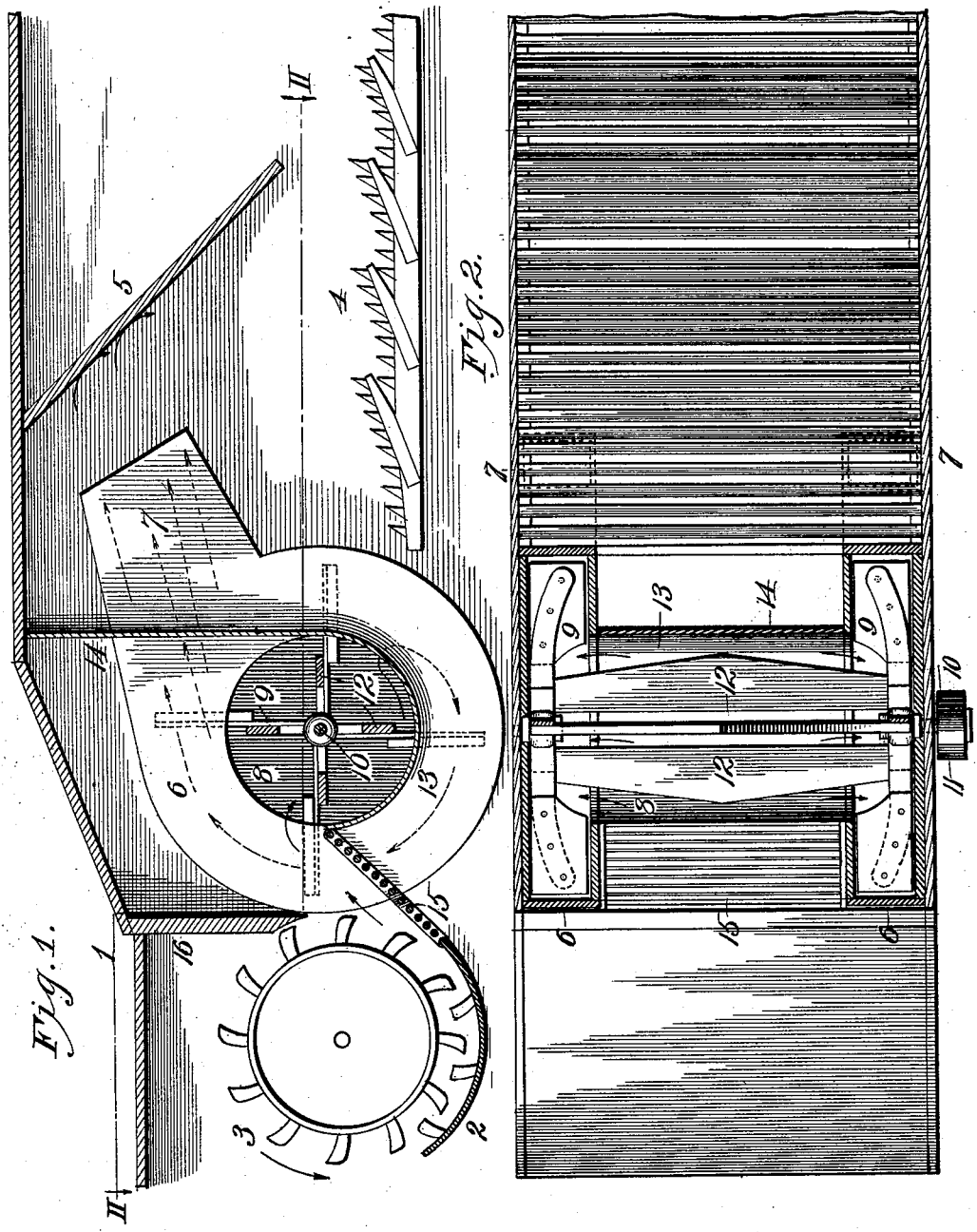

FRED W. PICKEREL AND WILLIAM W. McCUTCHAN, OF GARBER, OKLAHOMA TERRITORY.

THRESHING-MACHINE.

SPECIFICATION forming part of Letters Patent No. 688,331, dated December 10, 1901.

Application filed June 20, 1901. Serial No. 65,238. (No model.)

*To all whom it may concern:*

Be it known that we, FRED W. PICKEREL and WILLIAM W. McCUTCHAN, citizens of the United States, residing at Garber, in the county of Garfield and Territory of Oklahoma, have invented certain new and useful Improvements in Threshing-Machines, of which the following is a specification.

Our invention relates to threshing-machines, which as at present constructed thoroughly and efficiently thresh soft wheat, but are incapable of properly threshing the hard wheat of Oklahoma, where a large proportion of the crops do not fully mature, and therefore render it difficult to thresh the small grain from the boots or husks, and it is a well-known fact that a large quantity of this small grain is eventually threshed out by the wind-stacker and thrown with the straw upon the stack, a total loss.

Our object therefore is to avoid this loss of small grain by subjecting the straw immediately after it leaves the cylinder to a treatment analogous to that which it undergoes by the wind-stacker, said means consisting, essentially, of a curved bed interposed between the grate and the straw-rack, a stop-wall extending upward from the rear edge of the bed to the top of the machine, a check-board to prevent the straw and grain being carried around by the cylinder, and therefore insure its deposit on the bed, a pair of casings at opposite sides of said bed and provided with openings in their inner sides, a rotary beater to thresh and evenly distribute the straw on the bed and deflect it laterally in both directions into said casings, rotary paddle-wheels mounted on said shaft within said casings to throw the straw and grain in a continuous stream through the spouts of the casings, and a downwardly and rearwardly extending deflector intercepting these streams of straw and grain and adapted to deflect them down upon the straw-rack and effect their more complete separation and uniform distribution.

The invention further consists in certain novel and peculiar features of construction and organization of its parts, as hereinafter described and claimed, and in order that it may be fully understood reference is to be had to the accompanying drawings, in which—

Figure 1 represents a central longitudinal section of a threshing-machine embodying our invention. Fig. 2 is a horizontal section taken on the line II II of Fig. 1.

Referring now to the drawings, where like reference-numerals designate corresponding parts, 1 designates a threshing-machine of the usual or any preferred type, 2 the concave, and 3 the threshing-cylinder.

4 designates a straw-rack of the usual or any preferred construction, the front end of the same being disposed some distance rearward of the cylinder, so as to provide a space to receive mechanism hereinafter described, and vertically over the front end of the rack is a downwardly and rearwardly extending deflector 5.

Arranged within and against the sides of the machine and in said space between the threshing-cylinder and straw-rack are circular casings 6, having discharge-spouts 7 directed upward and contiguous to the deflector and having large openings 8 in their inner sides, and arranged within these casings and adapted to operate in the direction indicated by the dotted arrows, Fig. 1, are fans or paddle-wheels 9 of the construction shown or of any other suitable or preferred construction, these wheels being mounted rigidly on the transverse shaft 10, extending axially of the casing and journaled in the side walls of the machine, the shaft being provided at one end with a belt-wheel 11, adapted to be driven by a belt (not shown) connecting the cylinder with the usual separator-fan at the bottom of the machine, or it may be driven in any other suitable manner.

The beater for operating between the casings preferably consists of cross bars or wings 12, corresponding in number and attached at their opposite ends to the spokes of the wheels, the outer edges of said bars or wings being approximately V shape, with their apices centrally between the casings for a purpose which hereinafter appears.

13 designates a bed semicylindrical in cross-section of the same diameter as casing-openings 8 and extending marginally of the lower half of said openings from one of said casings to the other, so as to present its hollow side upward and conduct the straw and grain into said casings, and in order to prevent any of the straw and grain passing completely over and beyond the bed we provide a stop-wall 14, extending from the upper edge of the bed to the top of the machine.

To guide the straw and grain properly from the concave to the bed, we provide the usual or any preferred type of grate 15, said grate extending, preferably, in a straight line from the rear upper edge of the beater to the front edge of the bed, and the straw and grain are prevented from being carried over forwardly by the same by the check-wall 16, depending vertically from the top of the machine between the cylinder and the casings.

In the practical operation of the machine the cylinder operates, in conjunction with the concave, to thresh most of the grain from the straw and force it rearwardly and upwardly over the grate 15, through which a large proportion of the grain escapes to the grain-cleaning apparatus below in the usual manner, all of the straw and a portion of the grain following the course indicated by the full-line arrows and dropping down upon or into the bed, where it comes in contact with the beater, operating in the direction opposite to that in which the straw is moving, the peculiar outer or V-shaped configuration of the beater-wings serving to depress the central portion of the straw, and consequently crowd it laterally in both directions along the bed and through the openings 8 into the casings 6, where it is subjected to the action of the wheels, rotating in the same direction as the beater, as hereinbefore explained, and forced under such centrifugal action in the direction indicated by the dotted arrows, and finally projected with great force against the deflector 5, from which it drops down upon the straw-rack in the usual manner for the purpose of effecting the complete separation of the straw from the grain. Under the action of the beater it will be obvious that the volume of straw passing onto the bed is distributed evenly and at a uniform depth to the casings and that the fans or paddle-wheels thereof operating at an extremely high speed will discharge the straw and grain in streams of uniform thickness against the deflector. The forcible abutment against the latter will tend to effect a still greater spreading out and give an opportunity to the grain which is heavier to reach the straw-rack freed from the straw, which of course reliably insures its passage therethrough, the straw passing along the rack in the usual manner and being eventually received by the stacker. The severe treatment outlined to which the straw and grain are subjected efficiently separates the same, the small and immature as well as the large.

From the above description it will be apparent that we have produced a threshing-machine which embodies the feature of advantage enumerated as desirable in the statement of invention, and it will also be seen that our improvement is of simple, strong, durable, cheap, and compact construction and can be readily applied as an attachment to machines now in service or form a part of new machines. It will also be understood that while we have shown and described the preferred embodiment of the invention we reserve the right to make such changes in its detail construction, proportion, form, and arrangement as shall properly fall within the spirit and scope of the invention. In this connection it should be stated that where our improvement is used in conjunction with machines having the straw-rack terminating contiguous to or below the cylinder and concave the mechanism described and shown as between said rack and cylinder will preferably be located in about the same relation to the concave and cylinder that it now appears, but will of course be completely above the front end of said rack.

Having thus described the invention, what we claim as new, and desire to secure by Letters Patent, is—

1. In a threshing-machine, a deflector overhanging the straw-rack, a hollow bed interposed between the cylinder and the straw-rack and adapted to receive straw and grain from the concave and cylinder, a stop-wall extending upward from the rear margin of the bed, casings at opposite sides of and adapted to receive straw and grain from said hollow bed, a rotary beater rotating above the bed and adapted to force the straw and grain therefrom in opposite directions into said casings, and fans or paddle-wheels operating in the casings for forcing the straw and grain by centrifugal action rearwardly through the casings, and against the deflector, substantially as described.

2. In a threshing-machine, the combination of the threshing-cylinder, the concave, the straw-rack, means to deflect straw and grain down upon the rack, a hollow bed to receive straw and grain from the cylinder and concave, a stop-wall to prevent it passing over and beyond the bed, a pair of casings at opposite ends of the hollow bed and provided with rearwardly-projecting discharge-spouts, means for evenly distributing the straw on the bed and forcing it into said casings, and fans or paddle-wheels operating within the casings to force the straw and grain therein by centrifugal action outward through said discharge-spouts, substantially as described.

3. In a threshing-machine, the combination of the cylinder and concave, the straw-rack, an obliquely-extending deflector over the straw-rack, an upwardly and rearwardly extending grate, a hollow bed having its upper margin contiguous to the upper end of the grate, a stop-wall extending upward from the upper margin of the bed, a check-wall depending vertically from the top of the machine between the rear side of the cylinder and the casings, a rotary beater operating concentrically of and within the hollow bed, and fans or paddle-wheels operating with the beater within said casings, substantially as described.

In testimony whereof we affix our signatures in the presence of two witnesses.

FRED W. PICKEREL.
WILLIAM W. McCUTCHAN.

Witnesses:
MILTON C. GARBER,
T. LESLIE BICKFORD.